US012694358B2

(12) United States Patent
Zhang et al.

(10) Patent No.: US 12,694,358 B2
(45) Date of Patent: Jul. 28, 2026

(54) METHODS, SYSTEMS, APPARATUS, ELECTRONIC DEVICES, AND STORAGE MEDIA FOR EVALUATING WORK TASKS

(71) Applicant: Siemens Aktiengesellschaft, Munich (DE)

(72) Inventors: Bin Zhang, Beijing (CN); Armin Roux, Höchstadt a. d. Aisch (DE); Shun Jie Fan, Beijing (CN); Kai Lin Niu, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 19/114,507

(22) PCT Filed: Sep. 27, 2022

(86) PCT No.: PCT/CN2022/121775
§ 371 (c)(1),
(2) Date: Mar. 24, 2025

(87) PCT Pub. No.: WO2024/065189
PCT Pub. Date: Apr. 4, 2024

(65) Prior Publication Data
US 2025/0265531 A1    Aug. 21, 2025

(51) Int. Cl.
*G06Q 10/06* (2023.01)
*G06Q 10/0631* (2023.01)
*G06Q 10/0639* (2023.01)

(52) U.S. Cl.
CPC . *G06Q 10/06398* (2013.01); *G06Q 10/06311* (2013.01)

(58) Field of Classification Search
CPC ..................................................... G06Q 10/06
See application file for complete search history.

(56) References Cited

U.S. PATENT DOCUMENTS

2016/0081594 A1*   3/2016   Gaddipati ............ A61B 5/4824
                                                                   600/595
2017/0344919 A1*   11/2017   Chang ...................... G09B 5/02
                        (Continued)

FOREIGN PATENT DOCUMENTS

AU          2014201776 A1 * 12/2014   .............. G06F 3/011
AU          2015201877 A1 *  5/2015
                        (Continued)

OTHER PUBLICATIONS

Search Report for International Application No. PCT/CN2022/121775, 7 pages, May 29, 2023.
                        (Continued)

*Primary Examiner* — Kurtis Gills
(74) *Attorney, Agent, or Firm* — Slayden Grubert Beard PLLC

(57)    ABSTRACT

Various embodiments of the teachings herein include a method for evaluating a work task. An example includes: acquiring point cloud data of a workpiece in a work task and a three-dimensional image frame of a worker in the task; recognizing attribute information of the workpiece in a machine vision manner based on the data; recognizing action information of the worker in a deep learning manner based on the image frame; comparing combination information of the attribute information and the action information with a standard operating procedure of the work task, wherein the standard operating procedure comprising a standard attribute of the workpiece and a standard action of the worker in the work task; and evaluating the work task based on a comparing result.

20 Claims, 5 Drawing Sheets

(56) References Cited

U.S. PATENT DOCUMENTS

| | | | | |
|---|---|---|---|---|
| 2018/0089976 A1* | 3/2018 | Yarlagadda | ............ | G16H 40/67 |
| 2018/0218538 A1 | 8/2018 | Short | | |
| 2019/0043385 A1 | 2/2019 | Inoue | | |
| 2019/0086199 A1 | 3/2019 | Shieh | | |
| 2020/0327465 A1* | 10/2020 | Baek | ...................... | G16H 50/20 |
| 2021/0007874 A1* | 1/2021 | Galiana Bujanda | .... | A61F 5/028 |
| 2021/0142048 A1* | 5/2021 | Radwin | .................. | G06V 40/28 |
| 2021/0264764 A1* | 8/2021 | Glynn | .................. | G08B 25/016 |
| 2021/0290109 A1 | 9/2021 | Gaddipati et al. | | |
| 2021/0373664 A1* | 12/2021 | Duarte De Oliveira | ..................... | |
| | | | | G06F 3/015 |

FOREIGN PATENT DOCUMENTS

| | | |
|---|---|---|
| CN | 101673449 A | 3/2010 |
| CN | 113544604 A | 10/2021 |
| CN | 114898466 A | 8/2022 |
| JP | 2005242418 A | 9/2005 ........... G05B 19/418 |
| WO | WO-2022026658 A1 * | 2/2022 ........... A61B 5/7455 |

OTHER PUBLICATIONS

Salti, Samuele et al., "SHOT: Unique Signatures of Histograms for Surface and Texture Description," Computer Vision and Image Understanding, 37 pages, Sep. 8, 2014.

Kechagias-Stamatis, Odysseas et al., "Histogram of Distances for Local Surface Description," 2016 IEEE International Conference on Robotics and Automation (ICRA), 8 pages, May 16, 2016.

Srivastava, Siddharth et al., "3D Binary Signatures," arXiv:1708. 07937v1, 8 pages, Aug. 26, 2017.

Wang, Chunxiao et al., "A 3D Point Cloud Feature Identification Method Based on Improved Point Feature Histogram Descriptor," Electronics, vol. 12, 15 pages, Sep. 4, 2023.

Extended European Search Report, Application No. 22959839.6, 6 pages, Oct. 22, 2025.

* cited by examiner

METHODS, SYSTEMS, APPARATUS, ELECTRONIC DEVICES, AND STORAGE MEDIA FOR EVALUATING WORK TASKS

CROSS-REFERENCE TO RELATED APPLICATIONS

This application is a U.S. National Stage Application of International Application No. PCT/CN2022/121775 filed Sep. 27, 2022, which designates the United States of America, the contents of which are hereby incorporated by reference in their entirety.

TECHNICAL FIELD

The present disclosure relates to manufacturing task processing. Various embodiments of the teachings herein include methods, systems, apparatus, electronic devices, and storage media for evaluating work tasks.

BACKGROUND

At present, production workers basically operate according to paper specifications, but the paper specifications cannot intuitively instruct the workers how to work. Also, it's hard to detect whether each work step of the workers is performed in accordance with the specifications. Moreover, due to the complexity of the operation, higher requirements are placed on the operating skills and attention of the operators, and the workers may have problems such as unskilled operation during the operation process, which affects the work efficiency and reduces the product quality. Therefore, an assessment of the worker's work assignment is required.

SUMMARY

Teachings of the present disclosure may be embodied as methods, systems, apparatus, electronic devices, and/or storage media for evaluating work task. For example, some embodiments include a method for evaluating a work task, comprising: acquiring (101) point cloud data of a workpiece in a work task and a three-dimensional image frame of a worker in the work task; recognizing (102) attribute information of the workpiece in a machine vision manner based on the point cloud data; recognizing (103) action information of the worker in a deep learning manner based on the three-dimensional image frame; comparing (104) combination information of the attribute information and the action information with a standard operating procedure of the work task, wherein the standard operating procedure comprising a standard attribute of the workpiece and a standard action of the worker in the work task; and evaluating (105) the work task based on a comparing result.

In some embodiments, attribute information comprises a type of the workpiece; the method further comprises issuing an alarm message when type of the workpiece does not conform to standard type of the workpiece in the work task.

In some embodiments, method further comprises: determining a real time point of the action information; determining a standard action for the next time point of the real time point based on the standard operating procedure; and issuing a reminder message to remind the worker to perform the standard action for the next time point.

In some embodiments, the work task comprises a plurality of work phases, and the standard operating procedure comprises a plurality of sub-standard operating procedures respectively corresponding to the plurality of work phases; wherein the comparing combination information of the attribute information and the action information with a standard operating procedure of the work task comprising: splitting the combination information into a plurality of sub-combination information based on respective comparisons with the respective starting actions of the plurality of work phases, wherein the plurality of sub-combination information respectively corresponding to the plurality of work phases; and comparing each sub-combination information with the corresponding sub-standard operating procedure.

In some embodiments, the plurality of sub-standard operating procedures having respective standard working hours; wherein the comparing each sub-combination information with the corresponding sub-standard operating procedure comprising: comparing actual working hours corresponding to each sub-combination information with standard working hours of the corresponding sub-standard operating procedure; comparing attribute information in each sub-combination information standard with attribute of the corresponding sub-standard operating procedures; and comparing action information in each of the sub-combination information with standard action of the corresponding sub-standard operating procedures.

In some embodiments, the method further comprises: determining an overtime work phase, wherein actual working hours of the overtime work phase is greater than the corresponding standard working hours; determining the ratio of the number of overtime work phases to the number of all work phases; determining a work tool used by the worker in the overtime work phase when the ratio is less than a predetermined threshold; and issuing a prompt message to check the work tool.

In some embodiments, evaluating (105) the work task based on a comparing result comprises: generating a first evaluation value when action information conforms to standard action and attribute information conforms to standard attribute; generating a second evaluation value when action information conforms to standard action, attribute information does not conform to standard attribute, and attribute information is within a predetermined attribute interval; generating a third evaluation value when action information conforms to standard action, attribute information does not conform to standard attribute, and the attribute information is not within the predetermined attribute interval; and generating a fourth evaluation value when action information does not conform to standard action; wherein the first evaluation value is larger than the second evaluation value, the second evaluation value is larger than the third evaluation value, and the third evaluation value is larger than the fourth evaluation value.

As another example, some embodiments include a system for evaluating a work task, comprising: an acquisition module (10), configured to acquire point cloud data of a workpiece in a work task and a three-dimensional image frame of a worker in the work task; and a server (20), configured to: recognize attribute information of the workpiece in a machine vision manner based on the point cloud data; recognize action information of the worker in a deep learning manner based on the three-dimensional image frame; compare combination information of the attribute information and the action information with a standard operating procedure of the work task, wherein the standard operating procedure comprising a standard attribute of the workpiece and a standard action of the worker in the work task; and to evaluate the work task based on a comparing result.

In some embodiments, attribute information comprises a type of the workpiece; the server (20) is configured to an alarm message when type of the workpiece does not conform to standard type of the workpiece in the work task; the system further comprises a workstation (30), configured to display the alarm message.

In some embodiments, the server (20) is configured to: determine a real time point of the action information; determine a standard action for the next time point of the real time point based on the standard operating procedure; issue a reminder message to remind the worker to perform the standard action for the next time point; the system further comprises a workstation (30) configured to display the reminder message.

In some embodiments, the work task comprises a plurality of work phases, and the standard operating procedure comprising a plurality of sub-standard operating procedures respectively corresponding to the plurality of work phases; and the server (20) is configured to split the combination information into a plurality of sub-combination information based on respective comparisons with the respective starting actions of the plurality of work phases, wherein the plurality of sub-combination information respectively corresponding to the plurality of work phases; and to compare each sub-combination information with the corresponding sub-standard operating procedure.

In some embodiments, the plurality of sub-standard operating procedures having respective standard working hours; and the server (20) is configured to compare actual working hours corresponding to each sub-combination information with standard working hours of the corresponding sub-standard operating procedure; compare attribute information in each sub-combination information with standard attribute of the corresponding sub-standard operating procedures; and compare action information in each of the sub-combination information with standard action of the corresponding sub-standard operating procedures.

In some embodiments, the server (20) is configured to: determine an overtime work phase, wherein actual working hours of the overtime work phase is greater than the corresponding standard working hours; determine the ratio of the number of overtime work phases to the number of all work phases; determine a work tool used by the worker in the overtime work phase when the ratio is less than a predetermined threshold; and issue a prompt message to check the work tool; the system further comprises a workstation (30) is configured to display the prompt message.

As another example, some embodiments include an apparatus for evaluating a work task, comprising: an acquisition module (401), configured to acquire point cloud data of a workpiece in a work task and a three-dimensional image frame of a worker in the work task; a first recognition module (402), configured to recognize attribute information of the workpiece in a machine vision manner based on the point cloud data; a second recognition module (403), configured to recognize action information of the worker in a deep learning manner based on the three-dimensional image frame; a comparison module (404) configured to compare combination information of the attribute information and the action information with a standard operating procedure of the work task, wherein the standard operating procedure comprising a standard attribute of the workpiece and a standard action of the worker in the work task; and an evaluation module (405) configured to evaluate the work task based on a comparing result.

As another example, some embodiments include an electronic device, comprising a processor (501) and a memory (502), wherein an application program executable by the processor (501) is stored in the memory (502) for causing the processor (501) to execute a method for evaluating a work task as described herein.

As another example, some embodiments include a computer-readable medium comprising computer-readable instructions stored thereon, for executing one or more of the methods for evaluating a work task described herein.

As another example, some embodiments include a computer program product comprising a computer program executed by one or more processors to evaluate a work task as described herein.

BRIEF DESCRIPTION OF THE DRAWINGS

In order to make technical solutions of examples of the present disclosure clearer, accompanying drawings to be used in description of the examples will be simply introduced hereinafter. Obviously, the accompanying drawings to be described hereinafter are only some examples of the present disclosure. Those skilled in the art may obtain other drawings according to these accompanying drawings without creative labor.

LIST OF REFERENCE NUMBERS

Figure 1:
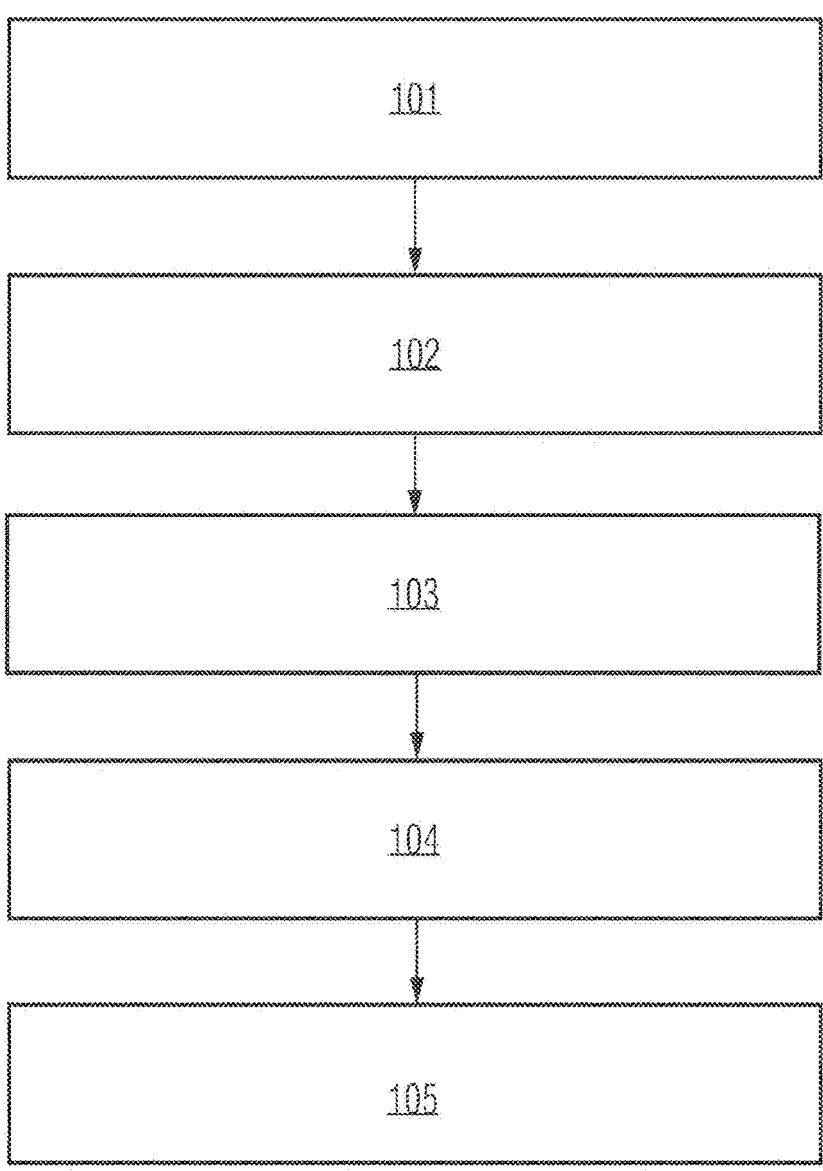
FIG. 1 is a flowchart of an example method of evaluating a work task incorporating teachings of the present disclosure.

| reference numbers | meanings |
| --- | --- |
| 101~105 | steps |
| 10 | acquisition module |
| 20 | server |
| 30 | workstation |
| 11 | point cloud scanner |
| 12 | 3D camera equipment |
| 21 | point cloud comparison algorithm |
| 22 | target recognition algorithm |
| 23 | algorithm library |
| 24 | real-time processing |
| 25 | action recognition |
| 26 | machine vision recognition |
| 27 | CAD model of workpiece |
| 28 | SOP |
| 31 | UI |
| 32 | prompt icon |
| 33 | alarm icon |
| 40 | acquisition process |
| 41 | Point cloud acquisition processing |
| 42 | 3D camera processing |
| 50 | recognition processing |
| 51 | data preprocessing |
| 52 | data association |
| 53 | machine vision recognition |
| 54 | action recognition |
| 60 | database |
| 61 | CAD model |
| 62 | SOP |

-continued

| reference numbers | meanings |
| --- | --- |
| 70 | evaluation processing |
| 71 | evaluation value generation processing |
| 72 | alarms and reminders |
| 400 | apparatus for evaluating work task |
| 401 | acquisition module |
| 402 | first recognition module |
| 403 | second recognition module |
| 404 | comparison module |
| 405 | evaluation module |
| 500 | electronic device, |
| 501 | processor |
| 502 | memory |

DETAILED DESCRIPTION

As an example of the teachings herein, some embodiments include a method for evaluating a work task comprising: acquiring point cloud data of a workpiece in a work task and a three-dimensional image frame of a worker in the work task; recognizing attribute information of the workpiece in a machine vision manner based on the point cloud data; recognizing action information of the worker in a deep learning manner based on the three-dimensional image frame; comparing combination information of the attribute information and the action information with a standard operating procedure of the work task, wherein the standard operating procedure comprising a standard attribute of the workpiece and a standard action of the worker in the work task; and evaluating the work task based on a comparing result. Therefore, work tasks are jointly evaluated in the two dimensions comprising the worker's action information and the workpiece's attribute information, thus improves evaluation accuracy.

In some embodiments, attribute information comprises a type of the workpiece; the method further comprises issuing an alarm message when type of the workpiece does not conform to standard type of the workpiece in the work task. As a result, the safety of work tasks can be improved.

In some embodiments, the method further comprises: determining a real time point of the action information; determining a standard action for the next time point of the real time point based on the standard operating procedure; issuing a reminder message to remind the worker to perform the standard action for the next time point. Therefore, efficiency of work tasks can be improved.

In some embodiments, the work task comprises a plurality of work phases, and the standard operating procedure comprises a plurality of sub-standard operating procedures respectively corresponding to the plurality of work phases; wherein the comparing combination information of the attribute information and the action information with a standard operating procedure of the work task comprising: splitting the combination information into a plurality of sub-combination information based on respective comparisons with the respective starting actions of the plurality of work phases, wherein the plurality of sub-combination information respectively corresponding to the plurality of work phases; comparing each sub-combination information with the corresponding sub-standard operating procedure. Therefore, splitting complex work tasks into multiple subtasks reduces the difficulty of comparison.

In some embodiments, the plurality of sub-standard operating procedures have respective standard working hours;

wherein the comparing each sub-combination information with the corresponding sub-standard operating procedure comprises: comparing actual working hours corresponding to each sub-combination information with standard working hours of the corresponding sub-standard operating procedure; comparing attribute information in each sub-combination information standard with attribute of the corresponding sub-standard operating procedures; comparing action information in each of the sub-combination information with standard action of the corresponding sub-standard operating procedures. Therefore, a multi-dimensional comprehensive evaluation is realized and the comprehensiveness of the evaluation is improved.

In some embodiments, the method further comprises: determining an overtime work phase, wherein actual working hours of the overtime work phase is greater than the corresponding standard working hours; determining the ratio of the number of overtime work phases to the number of all work phases; determining a work tool used by the worker in the overtime work phase when the ratio is less than a predetermined threshold; and issuing a prompt message to check the work tool. Therefore, timeouts due to work tools can be detected in time.

In some embodiments, the evaluating the work task based on a comparing result comprises: generating a first evaluation value when action information conforms to standard action and attribute information conforms to standard attribute; generating a second evaluation value when action information conforms to standard action, attribute information does not conform to standard attribute, and attribute information is within a predetermined attribute interval; generating a third evaluation value when action information conforms to standard action, attribute information does not conform to standard attribute, and the attribute information is not within the predetermined attribute interval; and generating a fourth evaluation value when action information does not conform to standard action; wherein the first evaluation value is larger than the second evaluation value, the second evaluation value is larger than the third evaluation value, and the third evaluation value is larger than the fourth evaluation value. Therefore, compared with the effect of the comparison between the attribute information and the standard attribute on the evaluation value, the comparison of the action between the worker's action and the standard action has a greater influence factor, which is beneficial for the worker to improve the accuracy of the action.

Some examples include a system for evaluating a work task, the system comprising: an acquisition module, configured to acquire point cloud data of a workpiece in a work task and a three-dimensional image frame of a worker in the work task; and a server, configured to: recognize attribute information of the workpiece in a machine vision manner based on the point cloud data; recognize action information of the worker in a deep learning manner based on the three-dimensional image frame; compare combination information of the attribute information and the action information with a standard operating procedure of the work task, wherein the standard operating procedure comprising a standard attribute of the workpiece and a standard action of the worker in the work task; and to evaluate the work task based on a comparing result.

In some embodiments, attribute information comprises a type of the workpiece; the server is configured to an alarm message when type of the workpiece does not conform to standard type of the workpiece in the work task; the system further comprising: a workstation, configured to display the alarm message.

In some embodiments, the server is configured to: determine a real time point of the action information; determine a standard action for the next time point of the real time point based on the standard operating procedure; issue a reminder message to remind the worker to perform the standard action for the next time point; the system further comprising: a workstation configured to display the reminder message.

In some embodiments, the work task comprises a plurality of work phases, and the standard operating procedure comprising a plurality of sub-standard operating procedures respectively corresponding to the plurality of work phases; the server is configured to split the combination information into a plurality of sub-combination information based on respective comparisons with the respective starting actions of the plurality of work phases, wherein the plurality of sub-combination information respectively corresponding to the plurality of work phases; and to compare each sub-combination information with the corresponding sub-standard operating procedure.

In some embodiments, the plurality of sub-standard operating procedures having respective standard working hours; the server is configured to compare actual working hours corresponding to each sub-combination information with standard working hours of the corresponding sub-standard operating procedure; compare attribute information in each sub-combination information with standard attribute of the corresponding sub-standard operating procedures; and compare action information in each of the sub-combination information with standard action of the corresponding sub-standard operating procedures.

In some embodiments, the server is configured to: determine an overtime work phase, wherein actual working hours of the overtime work phase is greater than the corresponding standard working hours; determine the ratio of the number of overtime work phases to the number of all work phases; determine a work tool used by the worker in the overtime work phase when the ratio is less than a predetermined threshold; and issue a prompt message to check the work tool; the system further comprising: a workstation is configured to display the prompt message.

Some embodiments include an apparatus for evaluating a work task comprising: an acquisition module, configured to acquire point cloud data of a workpiece in a work task and a three-dimensional image frame of a worker in the work task; a first recognition module, configured to recognize attribute information of the workpiece in a machine vision manner based on the point cloud data; a second recognition module, configured to recognize action information of the worker in a deep learning manner based on the three-dimensional image frame; a comparison module configured to compare combination information of the attribute information and the action information with a standard operating procedure of the work task, wherein the standard operating procedure comprising a standard attribute of the workpiece and a standard action of the worker in the work task; an evaluation module configured to evaluate the work task based on a comparing result.

Some embodiments include an electronic device comprising a processor and a memory, wherein an application program executable by the processor is stored in the memory for causing the processor to execute one or more of the methods for evaluating a work task described herein.

Some embodiments include a computer-readable medium comprising computer-readable instructions stored thereon, wherein the computer-readable instructions cause one or more processors to execute one or more of the methods for evaluating a work task described herein.

In order to make the purpose, technical scheme and advantages of the present disclosure more clear, the following examples are given to further explain in detail. In order to be concise and intuitive in description, the scheme is described below by describing several representative embodiments. Many details in the embodiments are only used to help understand the scheme. However, it is obvious that the technical scheme can be realized without being limited to these details. In order to avoid unnecessarily blurring the scheme, some embodiments are not described in detail, but only the framework is given. Hereinafter, "including" refers to "including but not limited to", "according to . . . " refers to "at least according to . . . , but not limited to . . . ". Due to the language habits of Chinese, when the number of an element is not specifically indicated below, it means that the element can be one or more, or can be understood as at least one.

FIG. 1 is a flowchart of an example method of evaluating a work task incorporating teachings of the present disclosure. As shown in FIG. 1, the method comprises:

Step 101: acquire point cloud data of workpiece in a work task and three-dimensional (3D) image frames of the worker in the work task. According to production volume and terminology (number of different types of products), production regularity (frequency of reproduction of the same type of product) and stability (the time of production of the same type of product), work tasks usually consist of three types of production: single production (single piece), serial production and mass production. The work task can be that workers can process various jobs by manually operating mechanical equipment such as milling machines, lathes, drilling machines, sewing machines, etc., which is suitable for manual processing of small batches and simple parts. The work task may also be that the worker processes the workpiece using numerical control equipment, wherein the numerical control equipment may include a machining center, a turning and milling center, an electric wire cutting equipment, a wire cutting machine tool, and the like.

A point cloud scanner can be used to collect point cloud data of workpieces in work tasks. Among them, a point cloud scanner is used to scan the workpiece, and the scan data is recorded in the form of points. Each point contains three-dimensional coordinates and can also contain color information (RGB) or reflection intensity information, and so on.

3D camera equipment can be used to capture 3D image frames of workers in work tasks, such as real-time 3D image sequences. For example, the 3D imaging device is a fisheye camera or a camera with depth information.

Step 102: Based on the point cloud data, the workpiece is identified and the attribute information of the workpiece is recognized by machine Specifically: first, perform denoising and filtering of point cloud data, calculate normal vectors for the denoised point cloud data, and then perform voxel grid down sampling to obtain key points to reduce the amount of computation. Moreover, for the key points, the histogram feature descriptor of the normal direction is calculated to obtain the SHOT descriptor associated with the target point cloud and the scene point cloud, and the K-tree structure search algorithm is used to find similarity based on Euclidean distance. In addition, clustering algorithm is called to obtain local point cloud set in the scene compared with a target point cloud based on the Hough voting algorithm, and then the target point cloud and the locked local point cloud set are compared using the point cloud comparison algorithm. Finally, in order to reduce the error rate, global hypothesis verification algorithm can be used to filter wrong points, and at the same time, the transformation matrix, rotation matrix and translation vector between the compared local point cloud set and the model point cloud can be printed, and the recognized target can be calibrated for visualization. output. Optionally, a workpiece CAD model can be utilized as the target for point cloud comparison.

For example, the attribute information of the workpiece identified based on the point cloud data may comprise:

(1) The physical characteristics of the workpiece, including surface features such as shape, color, characters, barcodes, etc.

(2) The physical size measurement parameters of the workpiece.

(3) The spatial position information of the workpiece.

(4) The surface state information of the workpiece is used to judge whether the workpiece has quality defects, such as appearance defects of parts, adhesion of pollutants and functional defects.

Step 103: Based on the 3D image frame, recognize action information of the worker by means of deep learning. Here, the adopted deep learning algorithm comprises: an unsupervised learning-based behavior recognition algorithm, a convolutional neural network-based behavior recognition algorithm, a recurrent neural network-based behavior recognition algorithm, and the like. Worker actions can be control actions that are issued for physical contact with the workpiece (e.g., moving a box), or remote-control actions (e.g., control operations on a touch screen) that are issued without physical contact with the workpiece.

In some embodiments, the recognized action information may comprise: (1) motion classification, such as screwing, moving, or hammering, etc.; (2) motion features, such as optical flow, speed, direction, trajectory, spatiotemporal context, or spatiotemporal context Points of interest, etc.

Step 104: Compare the combination information of the attribute information and the action information with standard operating procedure (SOP) of the work task, wherein the SOP comprises standard attributes of the workpiece in the work task and standard actions of the workers. Here, attribute information and action information can be combined in time dimension to form combined information. For example, the attribute information, the action information, and the first collection moment of the attribute information and the second collection moment of the action information are combined to obtain combined information with a time dimension. In some embodiments, the first collection time and the second collection time are preferably the same time, to realize synchronous combination of the attribute information and the action information. The first collection moment and the second collection moment may also be different, and the action information and the attribute information are causally related. For example, the action is to lift the box, the attribute is the height of the box after it is lifted, and so on.

Here, standard operating procedures for work tasks are pre-established. Standard operating procedure refers to the description of the standard operating procedures and requirements of work tasks in a unified format, which is used to guide and standardize the specific process of performing work tasks.

In some embodiments, the SOP may be a description file in a text format, which describes a plurality of standard attributes of a workpiece and a plurality of standard actions of a worker in a textual manner. In some embodiments, the description file further describes the temporal association relationship between the standard action and the standard attribute. Extract standard attributes described in text (such as physical size and spatial location) and standard actions described in text from standard operating procedures in text format through natural language processing, and the temporal association between the two relations.

For example, the text description file contains the description statement: "After the workpiece cleaning action is performed, the workpiece is free of contaminants." Based on the description sentence, the standard attribute comprises: no contaminants are attached to the workpiece; the standard actions comprise: cleaning, and the relationship between the standard attribute and the standard action is that: the cleaning action occurs before no contaminants are attached, that is, no contaminants adhered as a result of the cleaning action.

In some embodiments, the standard operating procedure may be a video file associated with a subtitle file that visually expresses the standard actions of the worker and textually describes the standard properties of the workpiece in the subtitle file. SOPs can be shown to workers on video to provide SOP training. Furthermore, the standard operating procedures can be reused to enable evaluation of work tasks of workers. Features of standard actions are extracted from video files through deep learning-based video extraction processing. Textual descriptions of standard properties of artifacts are extracted from subtitle files by means of natural language processing. Preferably, a temporal association relationship between the feature of the standard action and the text description of the standard attribute is established.

Step 105: Evaluate work tasks based on the comparison results. Here, the extracted action information can be compared with the corresponding standard actions, and the attribute information associated with the action information can be compared with the standard attributes associated with the standard actions. In one embodiment, based on the comparison result, evaluating the work task comprising: when the action information conforms to the standard action and the attribute information conforms to the standard attribute, generating a first evaluation value; when the action information conforms to the standard action, the attribute information conforms to the standard attribute When it does not meet and the attribute information is located in the predetermined attribute interval, the second evaluation value is generated; when the action information and the standard action conform, the attribute information does not meet the standard attribute, and the attribute information is not located in the predetermined attribute interval, the third evaluation value is generated; When the action information does not conform to the standard action, a fourth evaluation value is generated; wherein the first evaluation value is greater than the second evaluation value, the second evaluation value is greater than the third evaluation value, and the third evaluation value is greater than the fourth evaluation value.

Compared with the effect of the comparison between the attribute information and the standard attribute on the evaluation value, the action comparison between the worker's action and the standard action has a larger influence factor.

In some embodiments, the attribute information comprising the type of the workpiece; the method further comprising: when the type of the workpiece does not conform to the standard workpiece type of the work task, sending an alarm message. As a result, the safety of work tasks can be improved.

In some embodiments, the method further comprising: determining time point when the action information is detected (that is, the time when the action is executed);

determining a standard action for the next time point of the time point based on the SOP; sending out a reminder message for reminding the worker to perform the standard action for the next time point. Therefore, work efficiency can be improved by reminding the next standard action.

In some embodiments, the work task comprising a plurality of work phases, and the SOP comprising a plurality of sub-standard operating procedures respectively corresponding to the plurality of work phases; wherein the comparing combination information of the attribute information and the action information with a standard operating procedure of the work task comprising: splitting the combination information into a plurality of sub-combination information based on respective comparisons with the respective starting actions of the plurality of work phases, wherein the plurality of sub-combination information respectively corresponding to the plurality of work phases; comparing each sub-combination information with the corresponding sub-standard operating procedure. Therefore, splitting complex work tasks into multiple sub-tasks reduces the difficulty of comparison.

In some embodiments, the plurality of sub-standard operating procedures have respective standard working hours; wherein the comparing each sub-combination information with the corresponding sub-standard operating procedure comprising: comparing actual working hours corresponding to each sub-combination information with standard working hours of the corresponding sub-standard operating procedure; comparing attribute information in each sub-combination information with attribute of standard the corresponding sub-standard operating procedures; comparing action information in each of the sub-combination information with standard action of the corresponding sub-standard operating procedures. Therefore, a multi-dimensional comprehensive evaluation is realized and the comprehensiveness of the evaluation is improved.

In some embodiments, further comprising: determining an overtime work phase, wherein actual working hours of the overtime work phase is greater than the corresponding standard working hours; determining the ratio of the number of overtime work phases to the number of all work phases; determining a work tool used by the worker in the overtime work phase when the ratio is less than a predetermined threshold; issuing a prompt message to check the work tool. Therefore, timeouts due to work tools can be detected in time.

Considering that skilled workers are usually proficient in various work stages, if skilled workers work for too long in a particular work stage, it may be that the work tools used in the work stage are faulty or the work stage related to the work tools is defective, so the issue is issued. Check the prompt messages of the work tool to improve work efficiency.

Figure 2:
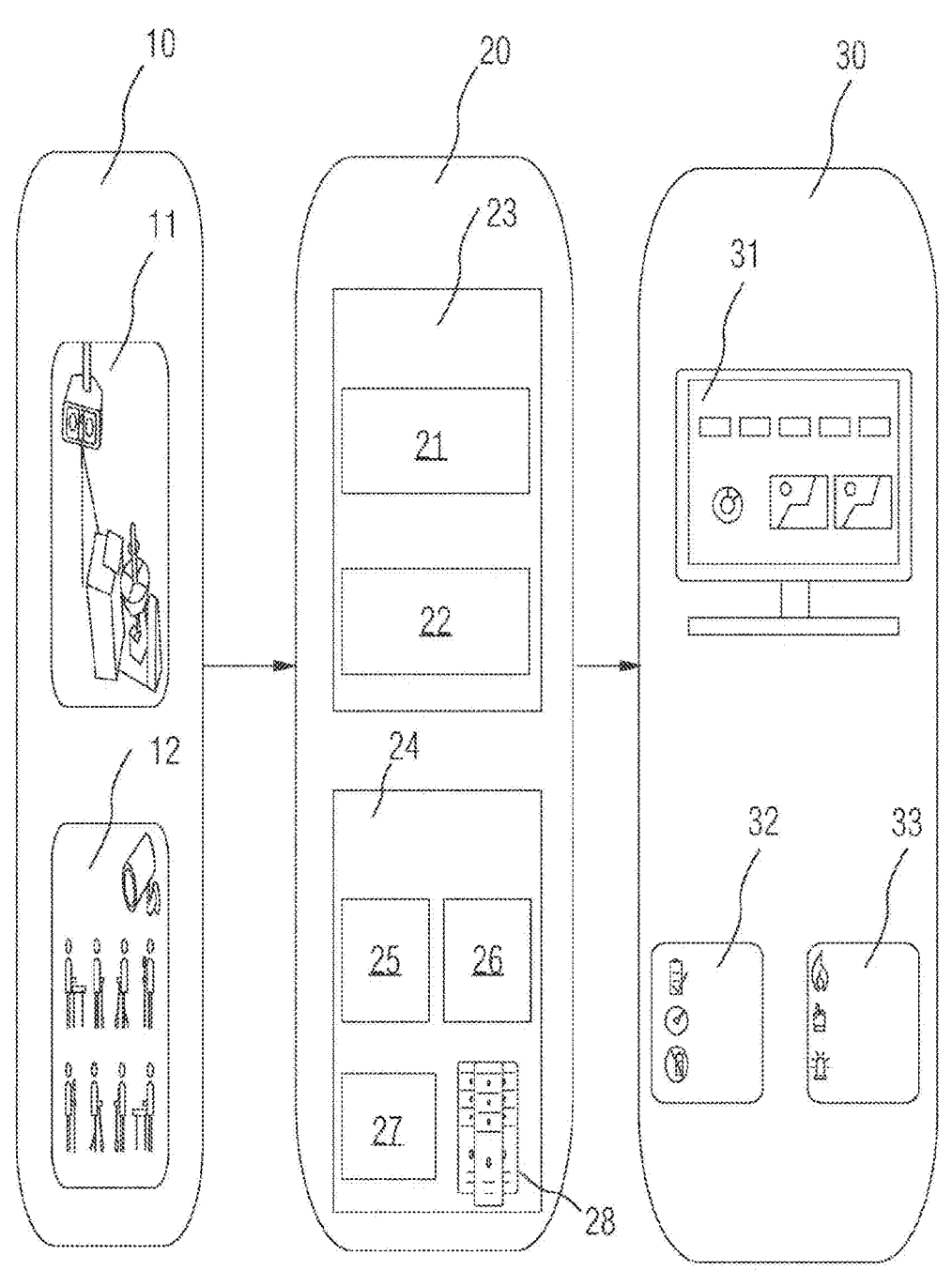
FIG. 2 is a block diagram of an example system for evaluating a work task incorporating teachings of the present disclosure.

FIG. 2 is a block diagram of an example system for evaluating work tasks incorporating teachings of the present disclosure. In FIG. 2, the system for evaluating work tasks comprising: acquisition module 10 is configured to acquire point cloud data of a workpiece in a work task and a three-dimensional image frame of a worker in the work task; and a server 20 configured to: recognize attribute information of the workpiece in a machine vision manner based on the point cloud data; recognize action information of the worker in a deep learning manner based on the three-dimensional image frame; compare combination information of the attribute information and the action information with a standard operating procedure of the work task, wherein the standard operating procedure comprising a standard attribute of the workpiece and a standard action of the worker in the work task; and to evaluate the work task based on a comparing result.

The acquisition module 10 may comprise a point cloud scanner 11 and a 3D camera device 12 arranged in a work site environment. The point cloud scanner 11 scans a workpiece to obtain point cloud data. The 3D camera device 12 captures 3D image frames of workers who is working on the workpiece. The acquisition module 10 sends the point cloud data and 3D image frame to server 20. The server 20 stores an algorithm library 23. The algorithm library 23 comprises a point cloud comparison algorithm 21 (e.g., ICP algorithm) and a neural network-based target detection algorithm 22 (e.g., CNN, RCNN, Fast RCNN or Faster RCNN).

Server 20 performs real-time processing 24 using point cloud data and 3D image frames. In real-time processing 24, a point cloud comparison algorithm 21 is invoked to perform machine vision recognition to identify attribute information of the workpiece, specifically comprising physical features, measurement parameters, spatial location, and surface state. In real-time processing 24, object detection algorithms 22 are also invoked to identify worker actions from the 3D image frames. The server 20 also stores a SOP 28 containing standard attributes of the workpiece and standard actions of the worker. The combined information of the attribute information of the workpiece and the action information of the worker is compared with the SOP of the work task. In the real-time process 24, based on the comparison results, the work tasks are evaluated.

Furthermore, the server 20 transmits the evaluation results to a workstation 30, which is usually located at the work site. The evaluation results are displayed on the display interface 31 of the workstation 30. Based on the comparison results, the server 20 can also generate prompt messages and alarm messages that can remind workers in time. Correspondingly, the prompt icon 32 and the alarm icon 33 can be displayed in the display interface 31 of the workstation 30.

In some embodiments, the attribute information comprising type of the workpiece; the server 20 is configured to issue an alarm message when the type of the workpiece does not conform to standard workpiece type of the work task; the system further comprising: a workstation 30 for displaying the alarm message.

In some embodiments, the server 20 is configured to determine time point of the action information; based on the SOP, determine standard action of the next time point of the time point; and send a reminder message; the system further comprising a workstation 30 configured to display the reminder message.

In some embodiments, the work task comprising plurality of work phases, and the SOP comprising a plurality of sub-standard operating procedures respectively corresponding to the plurality of work phases; the server 20 is configured to split the combination information into a plurality of sub-combination information based on respective comparisons with the respective starting actions of the plurality of work phases, wherein the plurality of sub-combination information respectively corresponding to the plurality of work phases; and to compare each sub-combination information with the corresponding sub-standard operating procedure.

In some embodiments, the plurality of sub-standard operating procedures having respective standard working hours; the server 20 is configured to compare actual working hours corresponding to each sub-combination information with standard working hours of the corresponding sub-standard operating procedure; compare attribute information in each sub-combination information with standard attribute of the corresponding sub-standard operating procedures; and compare action information in each of the sub-combination information with standard action of the corresponding sub-standard operating procedures.

In some embodiments, the server 20 is configured to: determine an overtime work phase, wherein actual working hours of the overtime work phase is greater than the corresponding standard working hours; determine the ratio of the number of overtime work phases to the number of all work phases; determine a work tool used by the worker in the overtime work phase when the ratio is less than a predetermined threshold; and issue a prompt message to check the work tool; the system further comprising: a workstation is configured to display the prompt message.

Figure 3:
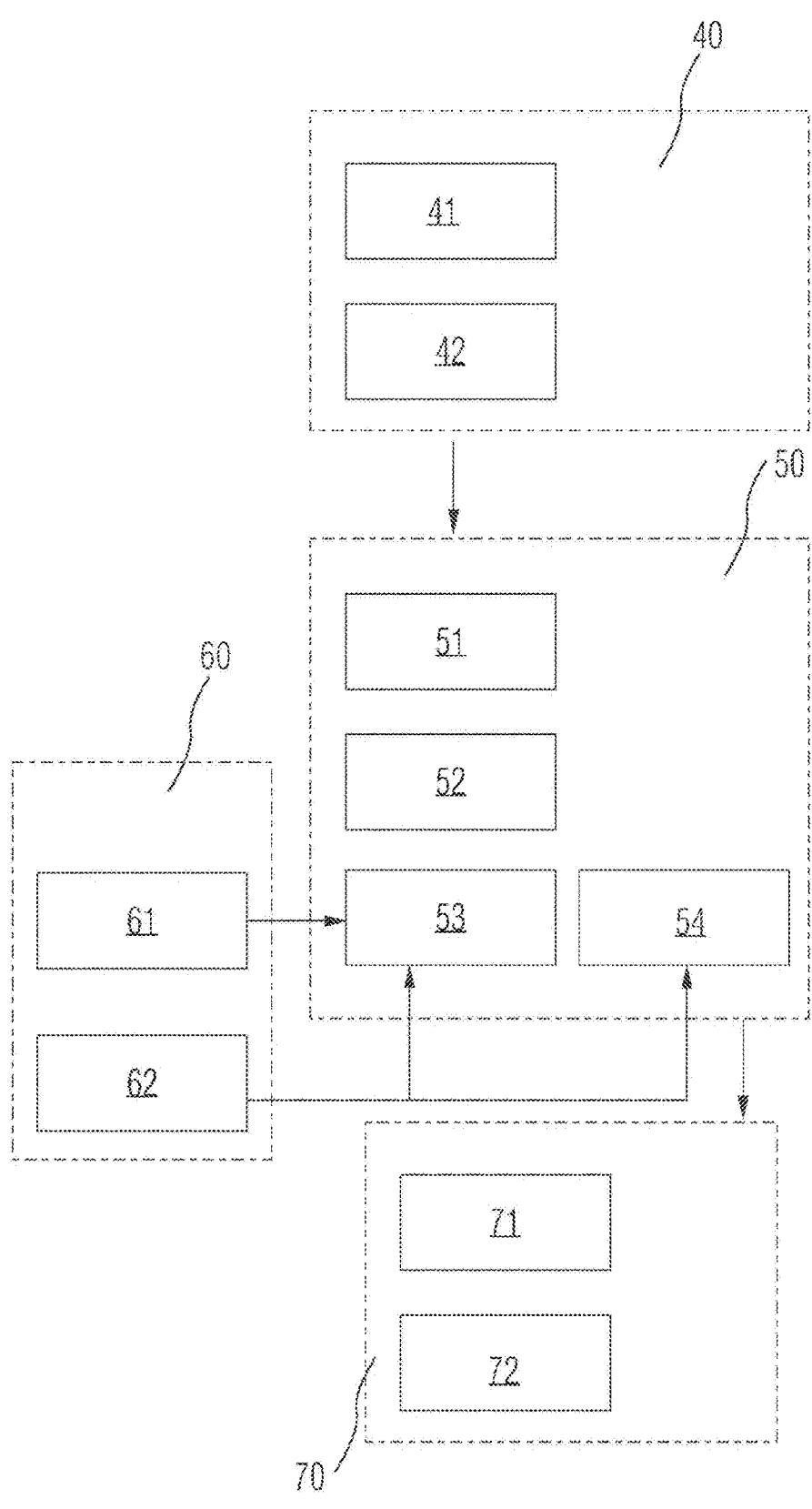
FIG. 3 is a schematic diagram of an example process for evaluating a work task incorporating teachings of the present disclosure.

FIG. 3 is a schematic diagram of an example process for evaluating work tasks incorporating teachings of the present disclosure. In the acquisition process 40, a point cloud acquisition process 41 is performed on the workpiece to acquire point cloud data; and a 3D imaging process 42 is performed on a worker who operates the workpiece with a tool to acquire a 3D image frame. In the recognition processing 50, first perform data preprocessing 51 on the point cloud data and the 3D image frame and then perform data association 52 between the 3D image frame and the point cloud data in the time dimension, that is, set the point cloud data and the 3D image frame respectively timestamp. Using the workpiece CAD model 61 stored in the database 60, machine vision recognition 53 is performed on the point cloud data to recognize the attribute information of the workpiece, comprising physical features, measurement parameters, spatial location, and surface state. Action recognition 54 is performed on the 3D image frame to recognize the actions of the worker. Combined evaluation of point cloud data and worker movements through a comparison process with SOP62 stored in database 60 is performed. In the evaluation process 70, the evaluation value generation process 71 is performed and alarm and reminder 72 are displayed.

Figure 4:
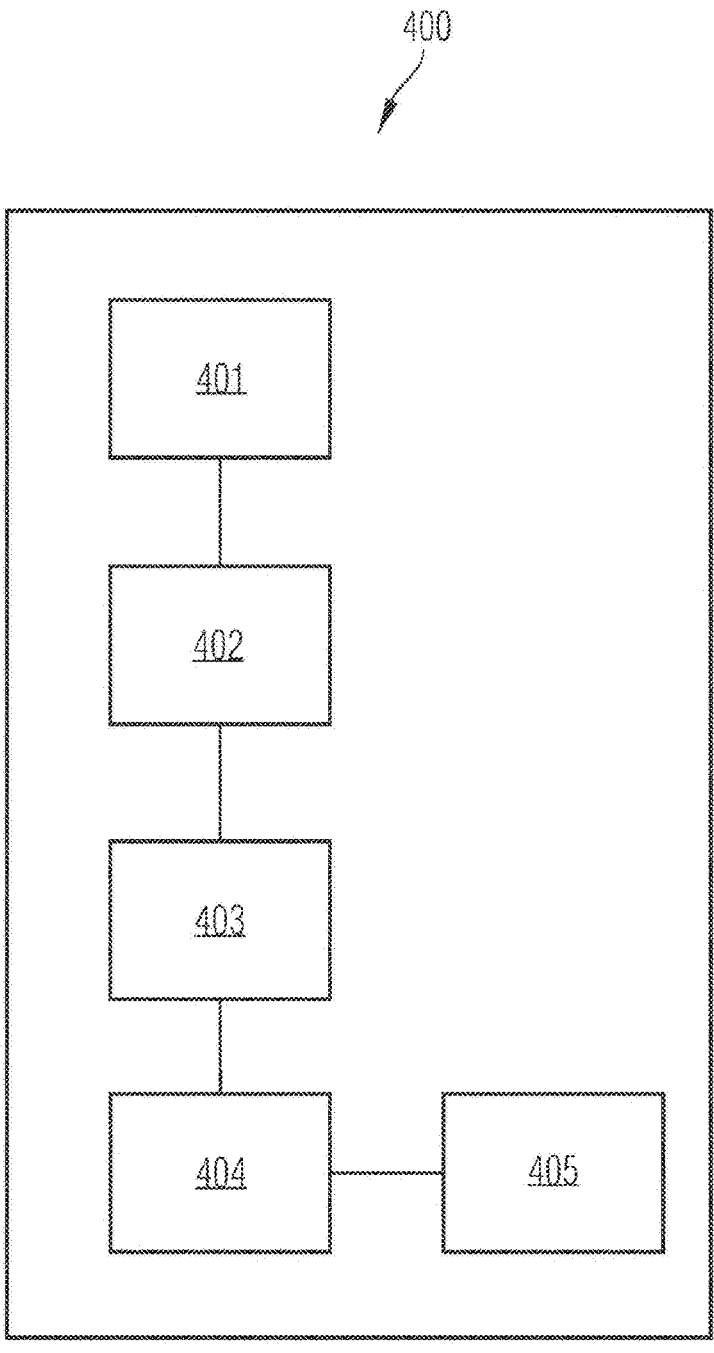
FIG. 4 is a structural diagram of an example apparatus for evaluating a work task incorporating teachings of the present disclosure.

FIG. 4 is a structural diagram of an example apparatus for evaluating work tasks incorporating teachings of the present disclosure. The evaluation apparatus comprises: an acquisition module 401, configured to acquire point cloud data of a workpiece in a work task and a three-dimensional image frame of a worker in the work task; a first recognition module 402, configured to recognize attribute information of the workpiece in a machine vision manner based on the point cloud data; a second recognition module 403, configured to recognize action information of the worker in a deep learning manner based on the three-dimensional image frame; a comparison module 404 configured to compare combination information of the attribute information and the action information with a standard operating procedure of the work task, wherein the standard operating procedure comprising a standard attribute of the workpiece and a standard action of the worker in the work task; and an evaluation module 405 configured to evaluate the work task based on a comparing result.

Figure 5:
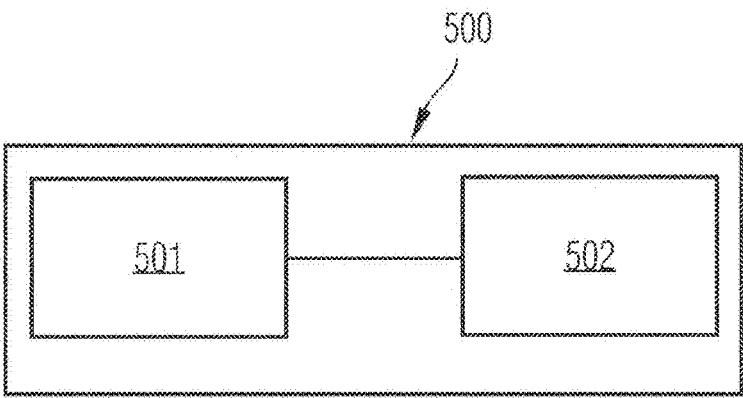
FIG. 5 is a structural diagram of an example electronic device incorporating teachings of the present disclosure.

Some embodiments include an electronic device with a processor-memory architecture. FIG. 5 is a structural diagram of an example electronic device incorporating teachings of the present disclosure. As shown in FIG. 5, the electronic device 500 comprises a processor 501, a memory 502 and a computer program stored in the memory 502 and running on the processor 501. When the computer program is executed by the processor 501, any of the methods for evaluating a work task described herein can be implemented. The memory 502 may specifically be implemented as various storage media such as Electrically Erasable Programmable Read-Only Memory (EEPROM), Flash memory (Flash memory), Programmable Program Read-Only Memory (PROM). The processor 501 may be implemented to include one or more central processing units or one or more field programmable gate arrays, wherein the field programmable gate arrays integrate one or more central processing unit cores. Specifically, the central processing unit or central processing unit core may be implemented as a CPU or MCU or DSP, and so on.

It should be noted that not all steps and modules in the above-mentioned processes and structural diagrams are necessary, and some steps or modules may be omitted according to actual needs. The execution order of each step is not fixed and can be adjusted as required. The division of each module is only to facilitate the description of the functional division used. In actual implementation, a module can be implemented by multiple modules, and the functions of multiple modules can also be implemented by the same module. These modules can be in the same device, or in a different device.

The hardware modules in various embodiments may be implemented mechanically or electronically. For example, a hardware module may include specially designed permanent circuits or logic devices (eg, special-purpose processors, such as FPGAS or ASICs) to perform specific operations. Hardware modules may also include programmable logic devices or circuits temporarily configured by software (e.g., including general-purpose processors or other programmable processors) for performing operations. As for the specific mechanical method, or a dedicated permanent circuit, or a temporarily configured circuit (e.g., configured by software) to realize the hardware module, it can be decided according to cost and time considerations.

The above descriptions are merely example embodiments of the present disclosure, and are not intended to limit the protection scope thereof. Any modification, equivalent replacement, improvement, etc. made within the spirit and principle shall be included within the protection scope of the present disclosure.

What is claimed is:

1. A method for controlling performance of a work task, the method comprising:

acquiring point cloud data of a workpiece in the work task via a point cloud scanner and a three-dimensional image frame of a worker in the work task via three-dimensional camera equipment;

performing, using a CAD model from a database, machine vision recognition on the point cloud data of the workpiece to recognize attribute information of the workpiece, wherein the performing machine vision recognition comprises performing voxel grid down sampling and the attribute information of the workpiece comprises physical features, measurement parameters, spatial location, and surface state;

recognizing action information of the worker in a deep learning manner based on the three-dimensional image frame;

comparing combination information of the attribute information and the action information with a standard operating procedure of the work task, wherein the standard operating procedure comprising a standard attribute of the workpiece and a standard action of the worker in the work task;

evaluating the work task based on a comparing result; and displaying an instruction for the worker as a result of the evaluating the work task;

wherein the instruction includes a message that includes at least one of: an alarm message if a type of workpiece used does not conform to a standard type of workpiece for the work task, a reminder message to remind the worker to perform a standard action for a future time point based on the standard operating procedure, and a prompt message to check the work tool.

2. The method according to claim 1, further comprising: determining a real time point of the action information; and determining a standard action for the next time point of the real time point based on the standard operating procedure.

3. The method according to claim 1, wherein:

the work task comprises a plurality of work phases;

the standard operating procedure comprises a plurality of sub-standard operating procedures respectively corresponding to the plurality of work phases; and the comparing the combination information of the attribute information and the action information with the standard operating procedure of the work task comprises:

splitting the combination information into a plurality of sub-combination information based on respective comparisons with the respective starting actions of the plurality of work phases, wherein the plurality of sub-combination information respectively corresponding to the plurality of work phases; and comparing each sub-combination information of the plurality of sub-combination information with the corresponding sub-standard operating procedure.

4. The method according to claim 3, wherein:

the plurality of sub-standard operating procedures have respective standard working hours; and the comparing each sub-combination information of the plurality of sub-combination information with the corresponding sub-standard operating procedure comprises:

comparing actual working hours corresponding to each sub-combination information with standard working hours of the corresponding sub-standard operating procedure;

comparing attribute information in each sub-combination information with standard attribute of the corresponding sub-standard operating procedures; and comparing action information in each of the sub-combination information with standard action of the corresponding sub-standard operating procedures.

5. The method according to claim 4, further comprising:

determining an overtime work phase, wherein actual working hours of the overtime work phase is greater than the corresponding standard working hours;

determining the ratio of the number of overtime work phases to the number of all work phases; and determining a work tool used by the worker in the overtime work phase when the ratio is less than a predetermined threshold.

6. The method according to claim 1, wherein the evaluating the work task based on the comparing result comprises:

generating a first evaluation value when action information conforms to standard action and attribute information conforms to standard attribute;

generating a second evaluation value when action information conforms to standard action, attribute information does not conform to standard attribute, and attribute information is within a predetermined attribute interval;

generating a third evaluation value when action information conforms to standard action, attribute information does not conform to standard attribute, and the attribute information is not within the predetermined attribute interval; and generating a fourth evaluation value when action information does not conform to standard action; and wherein the first evaluation value is larger than the second evaluation value, the second evaluation value is larger than the third evaluation value, and the third evaluation value is larger than the fourth evaluation value.

7. A system for evaluating a work task, the system comprising:

an acquisition module, which includes a point cloud scanner and a three-dimensional camera device, to acquire point cloud data of a workpiece in the work task via the point cloud scanner and a three-dimensional image frame of a worker in the work task via the three-dimensional camera device;

a server configured to:

perform, using a CAD model from a database, machine vision recognition on the point cloud data of the workpiece to recognize attribute information of the workpiece, wherein, to perform the machine vision recognition, the server is further configured to perform voxel grid down sampling and the attribute information of the workpiece comprises physical features, measurement parameters, spatial location, and surface state;

recognize action information of the worker in a deep learning manner based on the three-dimensional image frame;

compare combination information of the attribute information and the action information with a standard operating procedure of the work task, wherein the standard operating procedure comprising a standard attribute of the workpiece and a standard action of the worker in the work task; and evaluate the work task based on a comparing result; and a workstation to display an instruction for the worker as a result of evaluating the work task;

wherein the instruction includes a message that includes at least one of: an alarm message if a type of workpiece used does not conform to a standard type of workpiece for the work task, a reminder message to remind the worker to perform a standard action for a future time point based on the standard operating procedure, and a prompt message to check the work tool.

8. The system according to claim 7, wherein:

the attribute information comprises the type of the workpiece; and the server is further configured to generate the alarm message when the type of the workpiece does not conform to the standard type of the workpiece in the work task.

9. The system according to claim 7, wherein the server is further configured to:

determine a real time point of the action information;

determine a standard action for the next time point of the real time point based on the standard operating procedure; and issue a reminder message to remind the worker to perform the standard action for the next time point.

10. The system according to claim 7, wherein:

the work task comprises a plurality of work phases, and the standard operating procedure comprises a plurality of sub-standard operating procedures respectively corresponding to the plurality of work phases; and the server is further configured to:

split the combination information into a plurality of sub-combination information based on respective comparisons with the respective starting actions of the plurality of work phases, wherein the plurality of sub-combination information respectively corresponding to the plurality of work phases; and compare each sub-combination information with the corresponding sub-standard operating procedure.

11. The system according to claim 10, wherein:

the plurality of sub-standard operating procedures have respective standard working hours; and the server is further configured to:

compare actual working hours corresponding to each sub-combination information with standard working hours of the corresponding sub-standard operating procedure; compare attribute information in each sub-combination information with standard attribute of the corresponding sub-standard operating procedures; and compare action information in each of the sub-combination information with standard action of the corresponding sub-standard operating procedures.

12. The system according to claim 11, wherein the server is further configured to:

determine an overtime work phase, wherein actual working hours of the overtime work phase is greater than the corresponding standard working hours;

determine the ratio of the number of overtime work phases to the number of all work phases; and determine a work tool used by the worker in the overtime work phase when the ratio is less than a predetermined threshold.

13. An apparatus for evaluating a work task, the apparatus comprising:

an acquisition module, which includes a point cloud scanner and a three-dimensional camera device, configured to acquire point cloud data of a workpiece in the work task via the point cloud scanner and a three-dimensional image frame of a worker in the work task via the three-dimensional camera device;

a first recognition module configured to perform, using a CAD model from a database, machine vision recognition on the point cloud data of the workpiece to recognize attribute information of the workpiece, wherein, to perform machine vision recognition, the first recognition module is further configured to perform voxel grid down sampling and the attribute information of the workpiece comprises physical features, measurement parameters, spatial location, and surface state;

a second recognition module configured to recognize action information of the worker in a deep learning manner based on the three-dimensional image frame;

a comparison module configured to compare combination information of the attribute information and the action information with a standard operating procedure of the work task, wherein the standard operating procedure comprising a standard attribute of the workpiece and a standard action of the worker in the work task;

an evaluation module configured to evaluate the work task based on a comparing result; and a workstation configured to display an instruction for the worker as a result of evaluating the work task;

wherein the instruction includes a message that includes at least one of: an alarm message if a type of workpiece used does not conform to a standard type of workpiece for the work task, a reminder message to remind the worker to perform a standard action for a future time point based on the standard operating procedure, and a prompt message to check the work tool.

14. The method according to claim 1, wherein the performing voxel grid down sampling obtains key points; and wherein the performing the machine vision recognition on the point cloud data of the workpiece to recognize the attribute information of the workpiece comprises:

before the performing the voxel grid down sampling:

performing denoising and filtering of the point cloud data of the workpiece; and calculating normal vectors for denoised point cloud data from the performing denoising and filtering of the point cloud data of the workpiece.

15. The method according to claim 14, further comprising:

for the key points, calculating a histogram feature descriptor of a normal direction.

16. The method according to claim 15, further comprising:

obtaining a SHOT descriptor from the calculating the histogram feature descriptor of the normal direction.

17. The method according to claim 1, wherein the performing the machine vision recognition on the point cloud data of the workpiece to recognize the attribute information of the workpiece comprises identifying physical characteristics of the workpiece, physical size measurement parameters of the workpiece, or spatial position information of the workpiece.

18. The system according to claim 7, wherein the voxel grid down sampling obtains key points; and wherein, to perform the machine vision recognition on the point cloud data of the workpiece to recognize the attribute information of the workpiece, the server is further configured to:

before the voxel grid down sampling is performed:

perform denoising and filtering of the point cloud data of the workpiece; and calculate normal vectors for denoised point cloud data from the denoising the performing denoising and filtering of the point cloud data of the workpiece.

19. The system according to claim 18, wherein the server is further configured to, for the key points, calculate a histogram feature descriptor of a normal direction.

20. The apparatus according to claim 13, wherein the voxel grid down sampling obtains key points; and wherein, to perform the machine vision recognition on the point cloud data of the workpiece to recognize the attribute information of the workpiece, the first recognition module is further configured to:

before the voxel grid down sampling is performed:

perform denoising and filtering of the point cloud data of the workpiece; and calculate normal vectors for denoised point cloud data from the denoising the performing denoising and filtering of the point cloud data of the workpiece.

* * * * *